United States Patent [19]
Perlman

[11] 3,719,938
[45] March 6, 1973

[54] PHOTOELECTRIC INTRUDER DETECTION DEVICE

[76] Inventor: David E. Perlman, 59 Stoneham Drive, Rochester, N.Y. 14625

[22] Filed: Dec. 15, 1970

[21] Appl. No.: 98,355

[52] U.S. Cl. ............. 340/258 B, 250/214, 250/221
[51] Int. Cl. ........................................... G08b 13/00
[58] Field of Search ........ 340/258 B, 228 S; 307/311, 307/293, 235; 250/214, 220 C, 221; 328/2

[56] References Cited

UNITED STATES PATENTS

| | | |
|---|---|---|
| 3,167,739 | 1/1965 | Girard et al. ..................... 340/258 B |
| 3,444,544 | 5/1969 | Pearson et al. ..................... 250/221 |
| 3,370,284 | 2/1968 | Bagnd ............................. 340/258 B |
| 3,321,630 | 5/1967 | Durig .............................. 250/220 C |
| 3,585,401 | 6/1971 | Karl .................................. 307/293 |

Primary Examiner—John W. Caldwell
Assistant Examiner—Robert J. Mooney
Attorney—Warren W. Kurz

[57] ABSTRACT

A photoelectric intruder detection device including means for preventing false alarming in response to lightning flashes and other sources of severe electrical transients. Circuitry is provided for totally disabling the device for a predetermined time following the occurrence of such transients to permit the intruder detecting circuitry to stabilize.

2 Claims, 4 Drawing Figures

DAVID E. PERLMAN
INVENTOR.

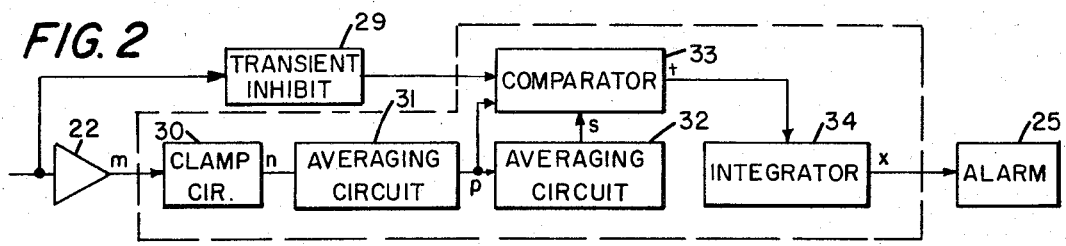
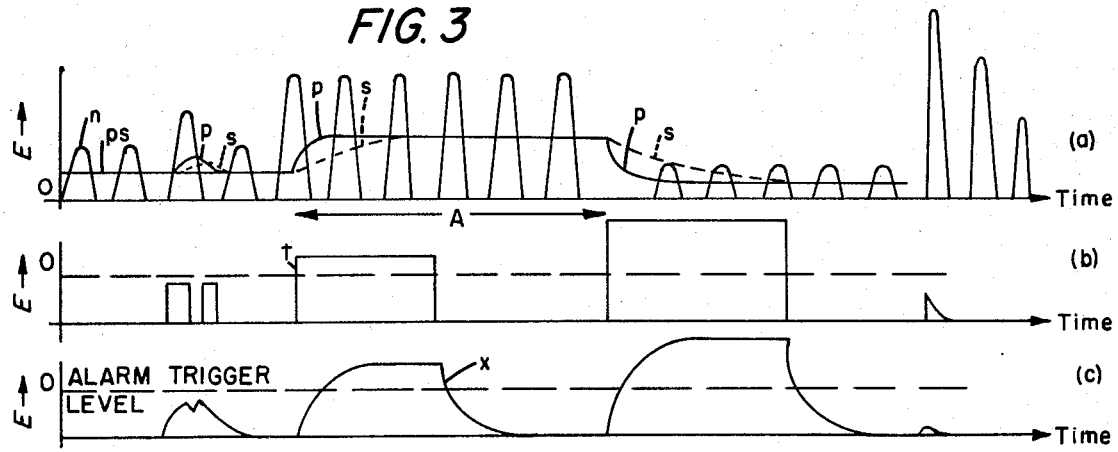
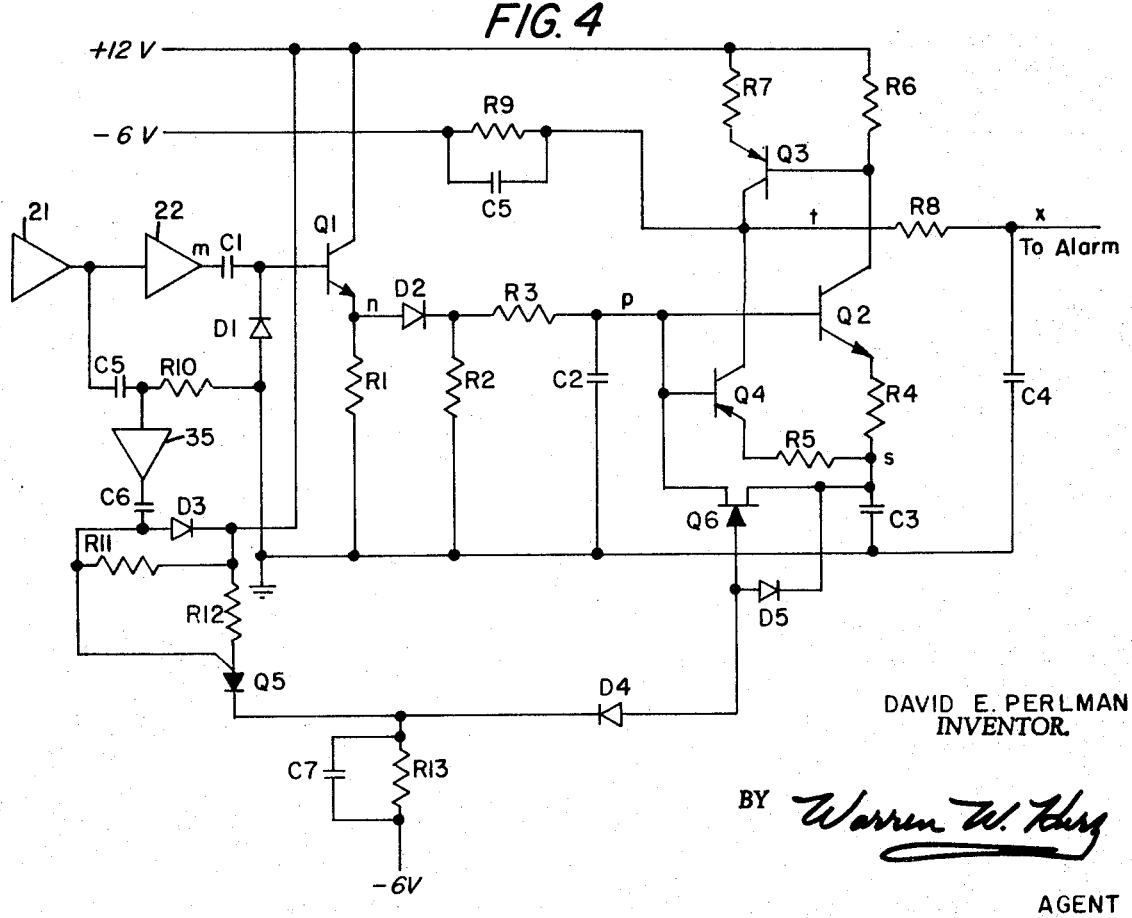

PHOTOELECTRIC INTRUDER DETECTION DEVICE

The present invention relates to a photoelectric intruder detection system and particularly to circuitry for eliminating the undesirable false alarm producing effects arising from high intensity, luminous and electrical transients.

In my co-pending commonly assigned Pat. application, Ser. No. 858,927, filed Sept. 18, 1959, now U.S. Pat. No. 3,644,917. I disclosed a single terminal photoelectric intruder detection device. This device senses the presence of an intruder by transmitting into a protected area the energy from a modulated luminous diode and monitoring changes in reflected energy at the diode frequency at a position adjacent the transmitter. Changes in the reflected energy occasioned by the presence of an intruder are sensed by a silicon photodiode the output of which is coupled with an alarm device through a level-sensitive alarm-activating circuit. The alarm-activating circuit comprises a pair of averaging circuits, each having a unique time constant. The output of the silicon diode is operably coupled with the inputs of the averaging circuits. When the output of the silicon diode changes, the outputs of the averaging circuits change at varying rates until the outputs stabilize at a level indicative of the increased or decreased energy incident upon the photodiode. A comparator circuit, operably coupled with the output of the averaging circuits, serves to provide an alarm-activating signal during the stabilization period. Preferably, the output of the comparator is integrated before being used to activate an alarm so as to prevent alarm activation in response to common electrical transients.

While the photoelectric device described above functions satisfactorily in most environments, false alarming problems have been occasionally experienced in situations which give rise to large positive-going transients at the input to the alarm activating circuit. Such transients, for instance, have been occasioned by bright flashes of lightning and by severe electrical disturbances. Since, in almost all cases, such transients are very intense compared to the desired signal and have much higher frequency components, it has been found that their presence can be used to activate circuitry whereby the alarm-activating circuit can be disabled for a predetermined period, thereby preventing a false or unwanted output therefrom.

In accordance with the present invention, there is provided a photoelectric intruder detection device of the type described in the aforementioned co-pending application which is insensitive to intense transients of the type described above. The detection device embodied by this invention employs a disabling circuit which acts upon the alarm-activating circuit sufficiently fast following the occurrence of an intense transient as to prevent an alarm-activating signal from being generated. Moreover, the disabling condition remains in effect long enough for the effects of the most severe disturbances to subside and for all circuits to stabilize following such disturbances.

A preferred embodiment of the invention has been chosen for the purpose of illustration and description and is shown in the accompanying drawings, brief descriptions of which are provided below.

FIG. 2 is a schematic block diagram illustrating the circuit components of the alarm-activating circuit of FIG. 1 and the transient disabling circuit of the invention;

FIG. 3 is a series of graphs illustrating the outputs of the various circuit components of the alarm-activating circuit as the input thereto varies with time;

FIG. 4 is an electrical schematic diagram of the alarm-activating circuit and transient disabling circuit of FIG. 2.

Figure 1:
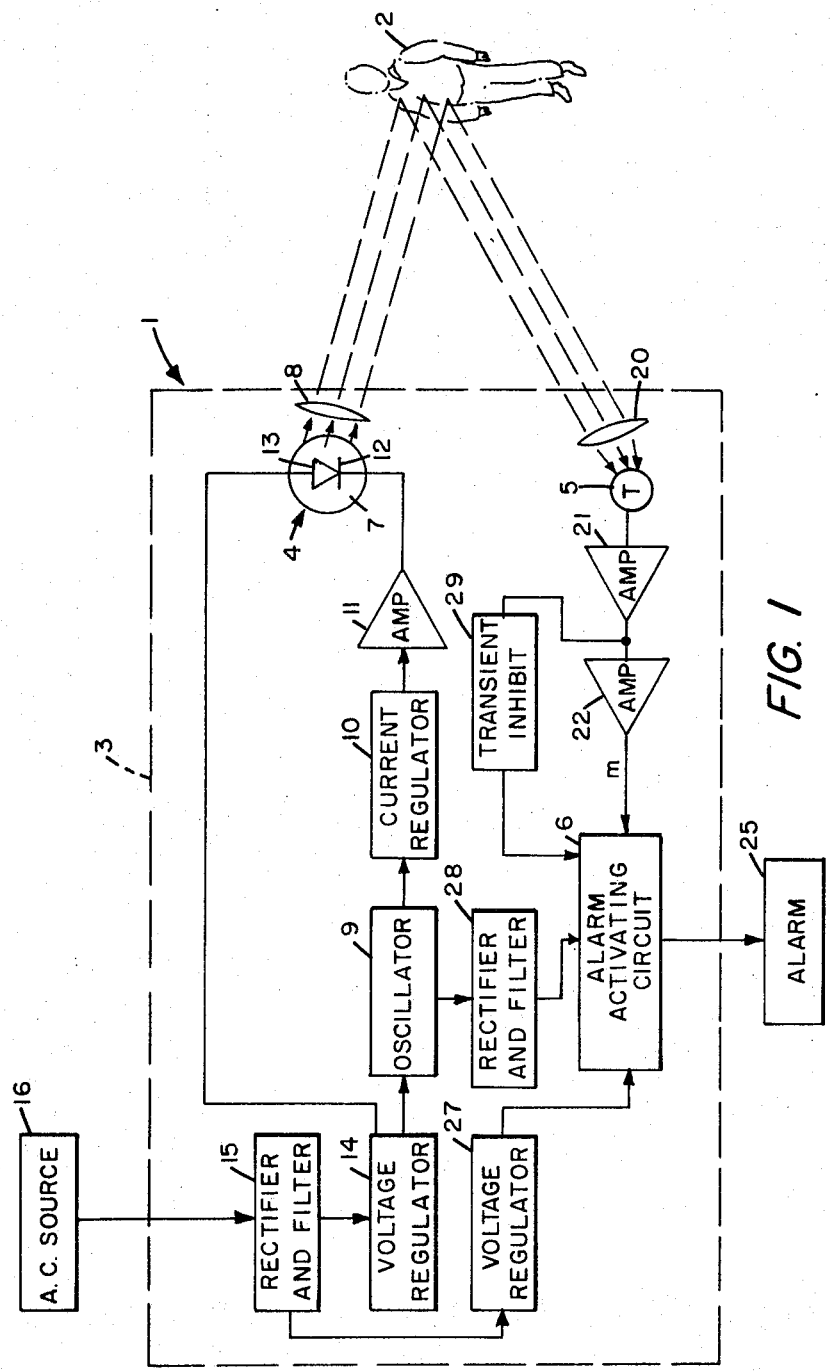
FIG. 1 is a schematic block diagram of a photoelectric intruder detection device according to a preferred embodiment of the invention.

Referring now to FIG. 1, a single terminal photoelectric intruder detection device 1 for detecting the presence of an intruder 2 in a space under surveillance by such device is shown in accordance with a preferred embodiment of the invention. The device comprises a housing 3 having disposed therein a transmitter 4 of electromagnetic radiation, a transducer 5 which is sensitive to the radiation provided by the transmitter 4 and capable of providing an electrical signal having an amplitude proportional to the magnitude of such radiation which is incident upon the sensitive surface thereof, and an alarm-activating circuit 6 which is electrically coupled with the output of transducer 5.

Preferably, the transmitter comprises a luminous or light emitting diode 7 (e.g., gallium arsenide or silicon carbide diodes) and a lens 8 which serves to direct energy from the source outwardly from the housing 3 and through the space which is under surveillance by the device. Luminous diodes are ideal for use in photoelectric devices of the intruder detection variety because of their relatively small size and ability to be modulated at electronic speeds. Gallium arsenide luminous diodes are preferable because of their ability to emit infrared radiation which is undetectable by the human eye. Thus, an intruder would be unable to determine the direction in which the device is aimed, even if he were aware of its presence. Luminous diode 7 is energized and pulse modulated by a conventional circuit which includes a multi-vibrator oscillator 9, a current regulator 10, and a power amplifier 11 which is connected in series with the cathode 12 of a luminous diode. Regulated voltage is provided to the diode energizing and modulating circuit and to the anode 13 of the luminous diode by a voltage regulator 14 which receives the direct current output of a rectifying and filtering circuit 15 which, in turn, is connected with a conventional alternating current source 16.

Transducer 5 preferably comprises a silicon photodiode which is arranged in the housing in such a manner as to receive radiant energy which has been transmitted by transmitter 4 and reflected by objects in the space under surveillance. A lens 20 serves to provide optical gain by condensing reflected energy upon the radiation sensitive surface of the transducer. The output of the transducer is then amplified by a conventional preamplifier 21 and the output thereof is then passed through a sharply tuned amplifier 22 which is tuned to the frequency of modulation provided by oscillator 9. The output $m$ of tuned amplifier 22 serves as the input to the alarm-activating circuit 6, described hereinafter, which activates an alarm 25 when the output $m$ varies in a predetermined manner above or below its long term or steady-state average value. The alarm-activating circuit 6 is energized by positive voltage from a second voltage regulator 27 connected with an output of the rectifying and filtering circuit 15, and is provided with a negative voltage from oscillator 9 through the rectifying and filtering circuit 28, the negative voltage serving to enhance the output of circuit 6 when input m decreases from a pre-existing low value.

In order to prevent the output from transducer 5 caused by bright flashes of light, such as lightning flashes, from producing an output from alarm-activating circuit 6 of sufficient magnitude to produce a false alarm, a transient disabling circuit 29 is coupled with the output of preamp 21 and its disabling output is fed to the alarm-activating circuit 6. The transient signal is preferably taken from the preamplifier where it is considerably larger than the desired signal since there is still too little gain for limiting to occur. The manner in which the disabling output from transient disable 29 interacts with the alarm-activating circuit 6 will become apparent from the ensuing description of circuit 6.

In FIG. 2, the components of alarm-activating circuit 6 are shown schematically. Output m of the tuned amplifier 22 is first fed through a conventional clamping circuit 30, commonly referred to as a "d.c. restorer" whereby the sine wave output of the tuned amplifier may be clamped to zero volts so that its full peak-to-peak amplitude can be detected. Because of the normal distortion associated with clamping circuits, the lower portion of the sine wave input will be clipped off by clamping circuit 30 and its output m will be as shown in waveform (a) of FIG. 3.

The clamping circuit output serves as the input n to a pair of averaging circuits 31 and 32 which are connected in series. Averaging circuit 31 serves to average its clipped sine wave input and provide an output p which is proportional to the average value thereof. It should be noted that, due to the inherently long time constant of averaging circuits in general, output p of averaging circuit 31 will substantially lag any rapid change in input. Thus, as illustrated in waveform (a) of FIG. 3 wherein input n is shown to suddenly increase for a period A and then suddenly decrease, output p will always assume a level equal to the average value of its input, but will assume such level at a much slower rate than that at which the input changes. Output p is then fed to the input of the second averaging circuit 32 which, again, averages its input and provides an output s proportional thereto; thus, circuit 32 averages the average value of input n. Obviously, when input n is constant, outputs p and s are identical. However, when input n changes to a new level, thereby causing output p to slowly change to a new level, output s will follow the change in output p, but, again, at a slower rate. As thus shown in waveform (a) of FIG. 3, when input n is constant, outputs p and s are identical; when input n changes to a new level, outputs p and s change accordingly, but at different rates.

Outputs p and s of averaging circuits 31 and 32, respectively serve as the inputs to a comparator circuit 33. Comparator 33 is capable of providing an output t whenever there is a difference in inputs exceeding a predetermined amount, output t having an amplitude related to the magnitude of the difference between the voltages p and s and a duration substantially equal to the duration of a difference in inputs p and s. Whenever the inputs to comparator 33 are identical or sufficiently close as to be below the threshold at which an output signal may be generated, output t is a constant negative voltage. See waveform (b) of FIG. 3.

Output t of comparator 33 is fed to an integrating circuit 34 which serves as a means to discriminate against false triggering of the alarm 25 due to rapid and/or low amplitude transients in the signal t. Integrator 34, having a relatively slow time constant, will gradually accumulate the output signal of comparator 33 and provide an output x proportional to the accumulated signal. When the accumulated output exceeds a predetermined level, alarm 25 will be activated. It should be noted that, because of the slow time constant of integrator 34, the integrator tends to reduce system sensitivity. If the time constant of integrator 34 were chosen so as to prevent transients of extreme amplitude from producing false alarms, it would be likely that the system would fail to detect some intrusion. In accordance with the present invention, the integrator time constant may be maintained at a relatively small value, thereby maintaining the system sensitivity at a relatively high value, without sacrificing reliability insofar as false alarming from intense transients is concerned. In response to a transient pulse from the preamplifier 21, the averaging circuits comprising the alarm-activating circuit 6 are short circuited for several seconds, thereby preventing any alarm-activating signal from being generated.

A preferred circuit for accomplishing the function of the transient disable is illustrated in FIG. 4 in combination with the alarm-activating circuit 6. As shown, the output of preamplifier 21 is fed to the tuned amplifier 22 of conventional design. The output n of tuned amplifier 22 is fed into the clamping circuit 6, comprising capacitor C1 and diode D1, which clamps the negative-going peaks of the sinusoidal signal to zero volts. The output of the clamping circuit is isolated from the following circuitry by the emitter-follower comprising transistor Q1 and its load resistor R1. The output n of emitter-follower Q1 is then fed into the first averaging circuit 31 comprising diode D2 and resistors R2 and R3, and capacitor C2. Resistor R2 provides a discharge path for C2, thereby permitting C2 to follow decreases in the input signal. The voltage accumulated across capacitor C2 will be proportional to the average value of the input to the averaging circuit. The output p of averaging circuit 31 is then fed to the input of the second averaging circuit 32 via the emitters of transistors Q2 and Q4. The second averaging circuit 32 comprises resistors R4 and R5 and capacitor C3. Voltage from a 12 volt supply (voltage regulator 27) is accumulated across C3 which charges through resistor R4 via transistor Q2 and resistor R6. When the voltage across capacitor C3 reaches the voltage across capacitor C2, transistor Q2 stops conducting and the outputs of averaging circuits 31 and 32 are substantially identical. The comparator circuit 33 comprises transistor Q2 (which serves the dual role of charging capacitor C3 when signal p increases and also passes the presence of such increases on to the output t) transistors Q3 and Q4 and resistors R6, R7 and R9. The integrator 34 comprises resistor R8 and capacitor C4.

The elements of the alarm-activating circuit function in the following manner: when the voltages across C2 and C3 are substantially the same, thereby indicating a constant steady-state input from tuned amplifier 22, transistors Q2, Q3 and Q4 are cut off due to the absence of forward bias and the output $x$ of the alarm-activating circuit is minus 6 volts. A negative voltage is preferred because it provides for increased outputs when the input to the circuit is decreased from a pre-existing low value. When the input from tuned amplifier 22 decreases, the voltage across capacitor C2 discharges proportionately through resistor R2, thereby causing the voltage across the capacitor C3 to exceed that across C2. When the voltage across C3 exceeds that across C2, an unbalance is created in the circuit and transistor Q4 becomes forward biased and conducts and so capacitor C3 discharges through resistor R5 to such an extent that the voltages across C2 and C3 are again substantially equal. Conduction of transistor Q4 causes a positive-going voltage to be developed across load resistor R9 which is then fed through resistor R8 to capacitor C4 which integrates it until the accumulated charge exceeds the triggering level of a relay drive circuit comprising alarm 25. When the input from tuned amplifier 22 increases, the voltage across capacitor C2 increases proportionately, thereby causing an unbalance with the voltage across capacitor C3. When the voltage across capacitor C2 exceeds that across capacitor C3, transistor Q2 and Q3 conduct and capacitor C3 charges via resistor R4 to approximately the same level as capacitor C2. Until capacitor C3 is charged to the same level as capacitor C2, a signal is passed by transistor Q2, through its load resistor R6. The voltage drop across R6 causes transistor Q3 to conduct. Resistor R7 serves to reduce the gain of transistor Q3 so that the overall sensitivity to signal increases does not exceed that of signal decreases. Transistor Q3 functions as an inverter so as to cause a voltage increase to appear across the output load resistor R9. Thus, the integrating circuit receives a positive-going input, notwithstanding the direction of change in input to the alarm-activating circuit. Capacitor C5 serves to suppress unwanted brief transients of low amplitude thereby acting as a pre-filter for integrator 34. Because the integrator 34 is responsive to the product of signal amplitude and duration, it is possible that very high amplitude, short-lived input signals, such as could be generated by lightning flashes and other high intensity electrical noise, could produce an alarm-activating output from the integrator. Such an alarm-activating output in response to a high amplitude transient is depicted in FIG. 3. To temporarily disable the alarm-activating circuit immediately following the occurrence of such a transient, additional circuitry is required. The transient signal is taken early in the amplifier where it is considerably larger than the signal produced by the reflected energy from an intruder since there is still too little gain for saturation to occur. The output of preamp 21 is conducted to transient amplifier 35 via a high-pass filter C5 and R10 and is again high-pass filtered by C6 and R11. This filtering serves to reduce the chance of desired signals from activating the cancel circuitry. A negative-going spike resulting from disturbances amplified by amplifier 35 triggers a programmable unijunction transistor Q5. Diode D3 serves as a discharge path for capacitor C6. When transistor Q5 switches on, it causes capacitor C7 to charge rapidly to plus 12 volts through resistor R12 which is a small resistor used primarily to limit the charge current to a safe value. Resistor R13 is very large (several megohms). It cannot conduct enough current to keep transistor Q5 in a conducting state. Thus, after capacitor C7 is charged, transistor Q5 goes off and capacitor C7 slowly discharges through resistor R13. This slow discharge at a high impedance level provides a lingering voltage that can be used to keep a field effect transistor turned on for several seconds. The field effect transistor connected as shown, acts as a switch which bridges capacitors C2 and C3 of the activating circuit 6 with a very low resistance thereby rapidly reducing any voltage difference between them to zero and preventing a voltage change at the comparator output $t$. In this manner, the activating circuit 6 is disabled long enough to permit an unwanted transient output at $n$ to subside. This is desirable, because a fast, intense disturbance at the input to tuned amplifier 22 can cause a ringing of damped oscillation in the output having a duration considerably longer than the disturbance which initiated it. This oscillation can appear to the alarm-activating circuit as a target. Therefore, the inhibit signal must last for several seconds, preferably 5 to 8 seconds, following the disturbance to allow the circuit to stabilize. The advantage of the field effect transistor is that it draws essentially no current at its input, thereby permitting the slow discharge of C7 and turn off of transistor Q5. Diode D4 prevents the positive voltage output of transistor Q5 from being conducted through the field effect transistor gate lead to charge capacitors C2 and C3. Diode D4 also permits the normal negative voltage at the cathode of Q5 to reach the field effect transistor gate thereby holding transistor Q6 off. Diode D5 serves as a return path for the gate of Q6 preventing it from "floating" at an unknown potential when diode D4 is cut off by a positive voltage on its cathode. Since the field effect transistor is a symmetrical device, it does not matter which of the two leads, drain or source, are connected to capacitor C2.

Although the invention has been described with particular reference to a specific embodiment, it should be apparent that variations and modifications can be made without departing from the spirit and scope of the invention as defined in the appended claims. For example, the inhibit could be applied to the output of integrator 34 in the form of a temporary short circuit across capacitor C4 or, it could be arranged so as to remove power from the alarm circuit 25.

I claim:

1. For use in a photoelectric intruder detection device comprising a means for transmitting a beam of radiant energy into an area to be protected from intrusion, a photoelectric transducer positioned to receive said energy as reflected or modified by objects within said beam and convert said energy into an electrical signal having an amplitude proportional to the intensity of received energy, and alarm-activating means having an input operably coupled with said signal and adapted to activate an alarm whenever said signal varies a predetermined amount from a steady-state value at a rate in excess of a predetermined value, the improvement comprising means operatively coupled to said signal for inhibiting alarm-activation by said activating means for a predetermined time interval in response to a high amplitude short duration transient change in said signal, whereby the device is rendered insensitive to bright flashes of radiant energy or intense electrical transients.

2. The invention according to claim 1 wherein said inhibiting means comprises a high-pass filter operably coupled with said signal, said filter being adapted to pass only those signals having frequency components characteristic of high amplitude transient signals, a monostable circuit operably coupled with said filter output, said circuit being normally non-conductive and capable of conducting for a predetermined interval in response to receiving an output from said high-pass filter, and means operably coupled with said monostable circuit output and said alarm-activating means for inhibiting an alarm-activating signal from said activating means for a predetermined time following the switching of said monostable circuit to a conductive state.

* * * * *